(12) United States Patent
Yang et al.

(10) Patent No.: US 10,367,394 B2
(45) Date of Patent: Jul. 30, 2019

(54) ELECTROMAGNETIC SPRING AND ELASTIC ACTUATOR HAVING THE SAME

(71) Applicant: INDUSTRIAL TECHNOLOGY RESEARCH INSTITUTE, Hsin-Chu (TW)

(72) Inventors: Han-Ping Yang, Hsinchu (TW); Chau-Shin Jang, Hsinchu County (TW); Jih-Yang Chang, Taoyuan (TW); Hsin-Tien Yeh, Taichung (TW); Tsu-Min Liu, Zhubei (TW)

(73) Assignee: INDUSTRIAL TECHNOLOGY RESEARCH INSTITUTE, Hsin-Chu (TW)

(*) Notice: Subject to any disclaimer, the term of this patent is extended or adjusted under 35 U.S.C. 154(b) by 326 days.

(21) Appl. No.: 15/343,758

(22) Filed: Nov. 4, 2016

(65) Prior Publication Data
US 2018/0019639 A1    Jan. 18, 2018

(30) Foreign Application Priority Data
Jul. 12, 2016 (TW) .............................. 105121954 A

(51) Int. Cl.
*H02K 7/00* (2006.01)
*H02K 7/116* (2006.01)
(Continued)

(52) U.S. Cl.
CPC .............. *H02K 7/116* (2013.01); *B25J 9/102* (2013.01); *B25J 19/068* (2013.01); *F16F 15/03* (2013.01);
(Continued)

(58) Field of Classification Search
CPC ......... H02K 7/116; H02K 7/003; F16F 15/18; F16F 15/03; B25J 19/068; B25J 9/102; F16H 1/28
See application file for complete search history.

(56) References Cited

U.S. PATENT DOCUMENTS

| 5,502,363 A | 3/1996 | Tasch et al. |
| 5,952,750 A | 9/1999 | Yokoyama et al. |

(Continued)

FOREIGN PATENT DOCUMENTS

| CN | 101934525 A | 1/2011 |
| CN | 101828045 B | 10/2012 |

(Continued)

OTHER PUBLICATIONS

JPO machine translation of JP 2014087170A, all pages, Takeuchi et al.*

(Continued)

*Primary Examiner* — Naishadh N Desai
(74) *Attorney, Agent, or Firm* — Locke Lord LLP; Tim Tingkang Xia, Esq.

(57) ABSTRACT

An elastic actuator is provided, which may include a position motor and an electromagnetic spring. The position motor may include a motor output shaft. The electromagnetic spring may include a rotor, a stator and a gear set. The stator may drive the rotor to rotate. The gear set may include a first output shaft, a second output shaft and an output shaft; the first input shaft may connect the motor output shaft, and the second input shaft may connect to the rotor. The power generated by the rotor and the power generated by the position motor may be outputted from the output shaft after being coupled via the gear set.

19 Claims, 10 Drawing Sheets

(51) Int. Cl.
*F16H 1/28* (2006.01)
*B25J 9/10* (2006.01)
*B25J 19/06* (2006.01)
*F16F 15/03* (2006.01)
*F16F 15/18* (2006.01)

(52) U.S. Cl.
CPC .............. *F16F 15/18* (2013.01); *F16H 1/28* (2013.01); *H02K 7/003* (2013.01)

(56) References Cited

U.S. PATENT DOCUMENTS

| | | | |
|---|---|---|---|
| 6,581,743 B2* | 6/2003 | Moroi | F16D 41/20 192/810 |
| 8,172,049 B2 | 5/2012 | Klingler et al. | |
| 8,193,885 B2 | 6/2012 | Godkin | |
| 8,525,460 B2 | 9/2013 | Reiland et al. | |
| 8,635,929 B2 | 1/2014 | Yang et al. | |
| 8,727,894 B2 | 5/2014 | Laffranchi et al. | |
| 8,933,607 B1* | 1/2015 | Gabrys | H02P 1/50 310/179 |
| 9,079,305 B2 | 7/2015 | Williamson et al. | |
| 9,086,101 B2 | 7/2015 | Zhu et al. | |
| 9,124,164 B2 | 9/2015 | Bauch et al. | |
| 9,149,370 B2 | 10/2015 | Herr et al. | |
| 9,239,100 B1 | 1/2016 | Weber et al. | |
| 2011/0190934 A1 | 8/2011 | Reiland et al. | |
| 2012/0330198 A1 | 12/2012 | Patoglu | |
| 2013/0002058 A1* | 1/2013 | McIntosh | H02K 1/185 310/43 |
| 2013/0306430 A1 | 11/2013 | Laffranchi et al. | |
| 2014/0067124 A1 | 3/2014 | Williamson et al. | |
| 2014/0100491 A1 | 4/2014 | Hu et al. | |
| 2014/0121782 A1 | 5/2014 | Herr et al. | |
| 2014/0145547 A1* | 5/2014 | Nakano | H02K 21/16 310/216.069 |
| 2014/0274545 A1* | 9/2014 | Ward | B62M 11/18 475/269 |
| 2016/0082603 A1 | 3/2016 | Schimmels et al. | |
| 2016/0153535 A1 | 6/2016 | Yang et al. | |

FOREIGN PATENT DOCUMENTS

| | | | |
|---|---|---|---|
| CN | 105587812 A | | 5/2016 |
| EP | 2375056 A1 | | 10/2011 |
| JP | 2014087170 A | * | 5/2014 |
| JP | 2014087170 A | | 5/2014 |
| TW | M293393 U | | 7/2006 |
| TW | 200631206 A | | 9/2006 |
| TW | 201020410 A | | 6/2010 |
| TW | 201105467 A | | 2/2011 |
| TW | 201200314 A | | 1/2012 |
| TW | M519487 U | | 4/2016 |
| TW | I538363 B | | 6/2016 |

OTHER PUBLICATIONS

Intellectual Property Office, Ministry of Economic Affairs, R. O. C, "Office Action", dated Mar. 6, 2017, Taiwan.
Sebastian Wolf et al., A New Variable Stiffness Design:Matching Requirements of the Next Robot Generation, IEEE International Conference on Robotics and Automation, 2008, 1741-1746.
Nikos G. Tsagarakis et al., A New Varibable Stiffness Actuator (CompAct-VSA):Design and Modeling, IEEE/RSJ International Conference on Intelligent Robots and Systems, 2011, 378-383.
Heike Vallery et al., Compliant Actuation of Rehabilitation Robots, IEEE Robotics & Automation Magazine, 2008, 60-69.
Gill A. Pratt et al., Series Elastic Actuators, IEEE, 1995, 399-406.
Shigian Wang et al., Spring Uses in Exoskeleton Actuation Design, IEEE International Conference on Rehabilitation Robotics, 2011, 1-6.
Sebastian Wolf et al., The DLR FSJ:Energy based design of a variable stifness joint, IEEE International Conference on Robotics and Automation, 2011, 5082-5089.
Extended European Search Report, dated Jul. 4, 2017, Germany.

* cited by examiner

ELECTROMAGNETIC SPRING AND ELASTIC ACTUATOR HAVING THE SAME

CROSS REFERENCE TO RELATED APPLICATION

All related applications are incorporated by reference. The present application is based on, and claims priority from, Taiwan Application Serial Number 105121954, filed on Jul. 12, 2016, the disclosure of which is hereby incorporated by reference herein in its entirety.

TECHNICAL FIELD

The technical field relates to an electromagnetic spring and an elastic actuator having the electromagnetic spring.

BACKGROUND

In general, advance of technology results in swift development of rehabilitation robot; currently, rehabilitation robot can already help physical therapists perform high-intensity training for patients. Therefore, a lot of manpower and time are saved. In addition, rehabilitation robot can not only train patients by conventional rehabilitation training, but also can train the patients by interactive rehabilitation training. In other words, the stiffness of the joints of a robot is adjustable. When the muscle strength of a patent is insufficient, the stiffness of the joints of the robot should increase to help the patient in training; on the contrary, when the muscle strength of the patent is sufficient, the stiffness of the joints of the robot should decrease for the patient to more effectively train his/her muscle. For the purpose of adjusting the stiffness of the joints of the robot, it is necessary to install an elastic actuator on the robot.

SUMMARY

One embodiment provides an elastic actuator, which may include a position motor and an electromagnetic spring. The position motor may include a motor output shaft. The electromagnetic spring may include a rotor, a stator and a gear set. The stator may drive the rotor to rotate. The gear set may include a first output shaft, a second output shaft and an output shaft; the first input shaft may connect the motor output shaft, and the second input may connect to the rotor. The power generated by the rotor and the power generated by the position motor may be outputted from the output shaft after being coupled via the gear set.

Another embodiment provides an elastic actuator, which may include a positioning motor, an electromagnetic spring. The electromagnetic spring may include a rotor, a stator and a gear set. The stator may drive the rotor to rotate. The gear set may include a first input shaft, a second input shaft and an output shaft; the first input shaft may connect to the motor output shaft, and the second input shaft may connect to the rotor; the power generated by the rotor and the power generated by the position motor may be coupled via the gear set, and then outputted from the output shaft.

Any embodiment can be used in combination with any other embodiment described in the application.

Further scope of applicability of the present application will become more apparent from the detailed description given hereinafter. However, it should be understood that the detailed description and specific examples, while indicating exemplary embodiments of the disclosure, are given by way of illustration only, since various changes and modifications within the spirit and scope of the disclosure will become apparent to those skilled in the art from this detailed description.

BRIEF DESCRIPTION OF THE DRAWINGS

The present disclosure will become more fully understood from the detailed description given herein below and the accompanying drawings which are given by way of illustration only, and thus are not limitative of the present disclosure and wherein.

DETAILED DESCRIPTION

Figure 1:
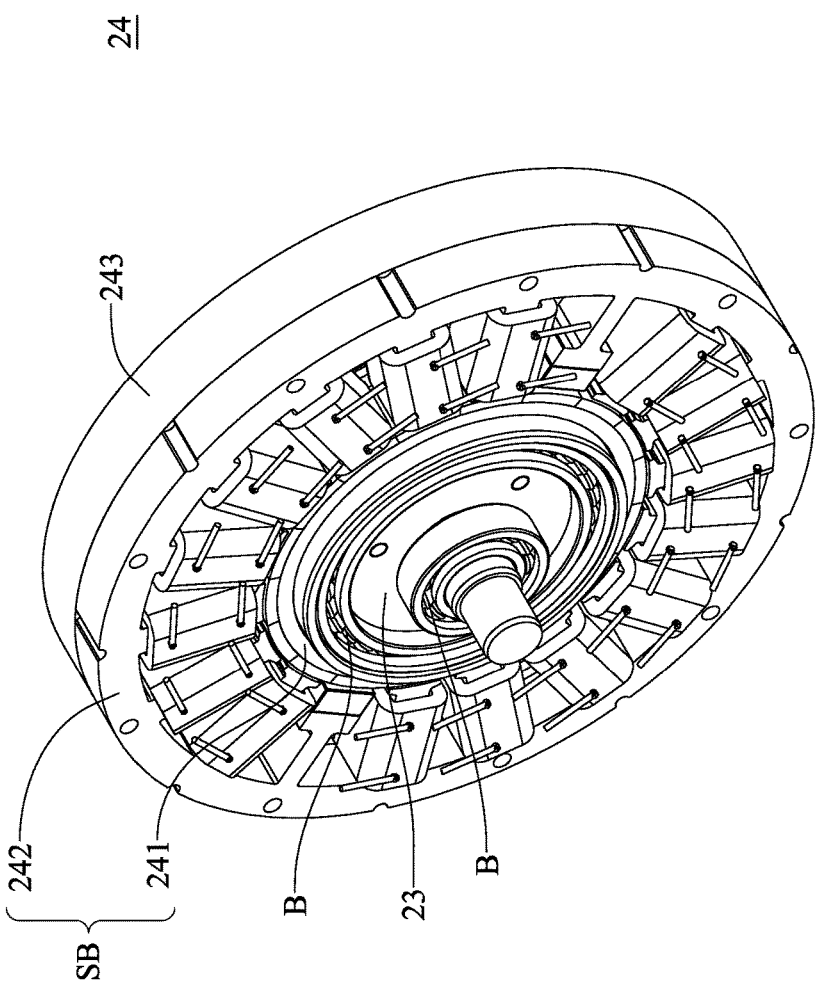
FIG. 1 is a first schematic view of a first embodiment of an electromagnetic spring in accordance with the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 2:
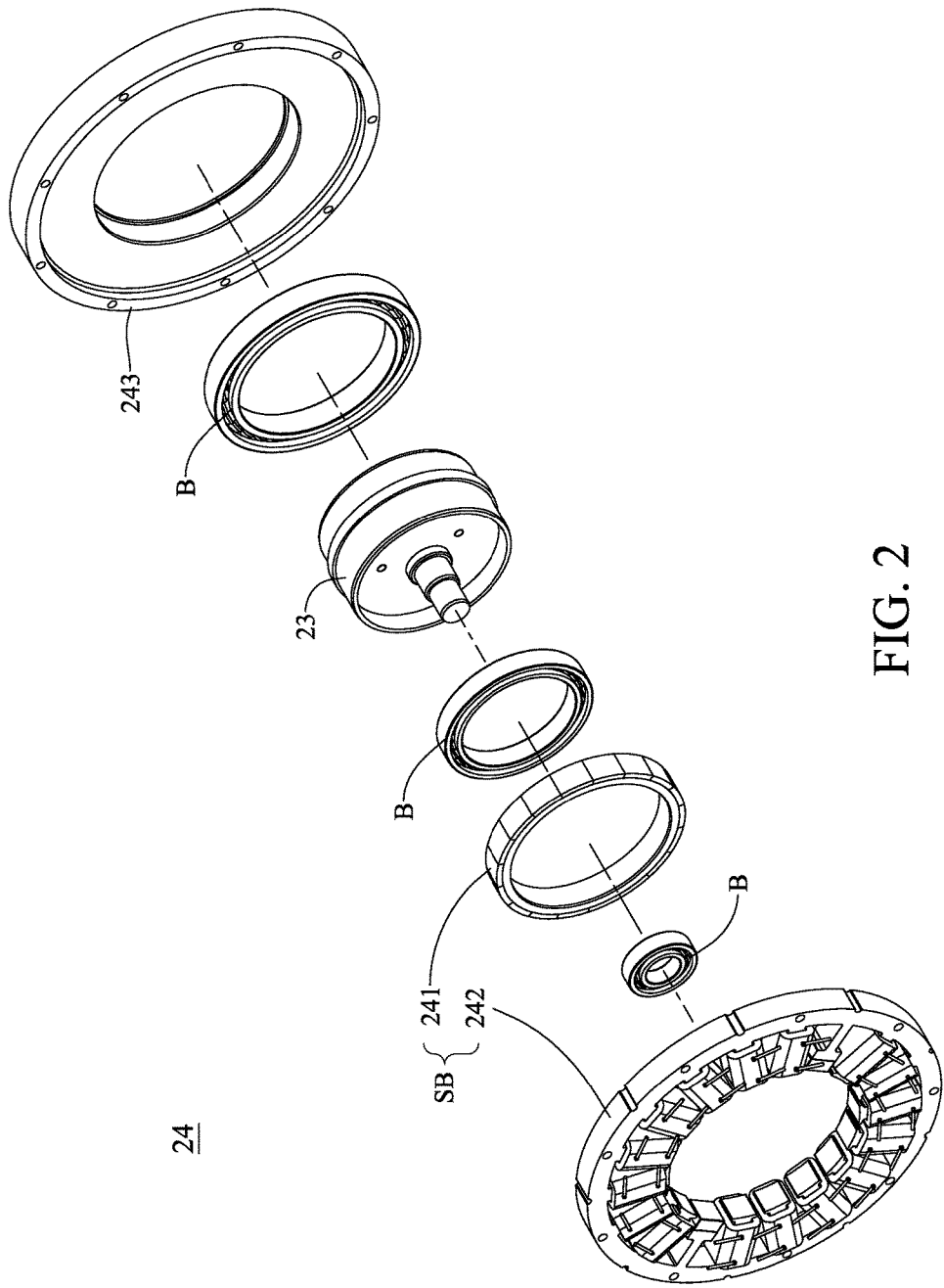
FIG. 2 is a second schematic view of a first embodiment of an electromagnetic spring in accordance with the present disclosure.
Figure 3:
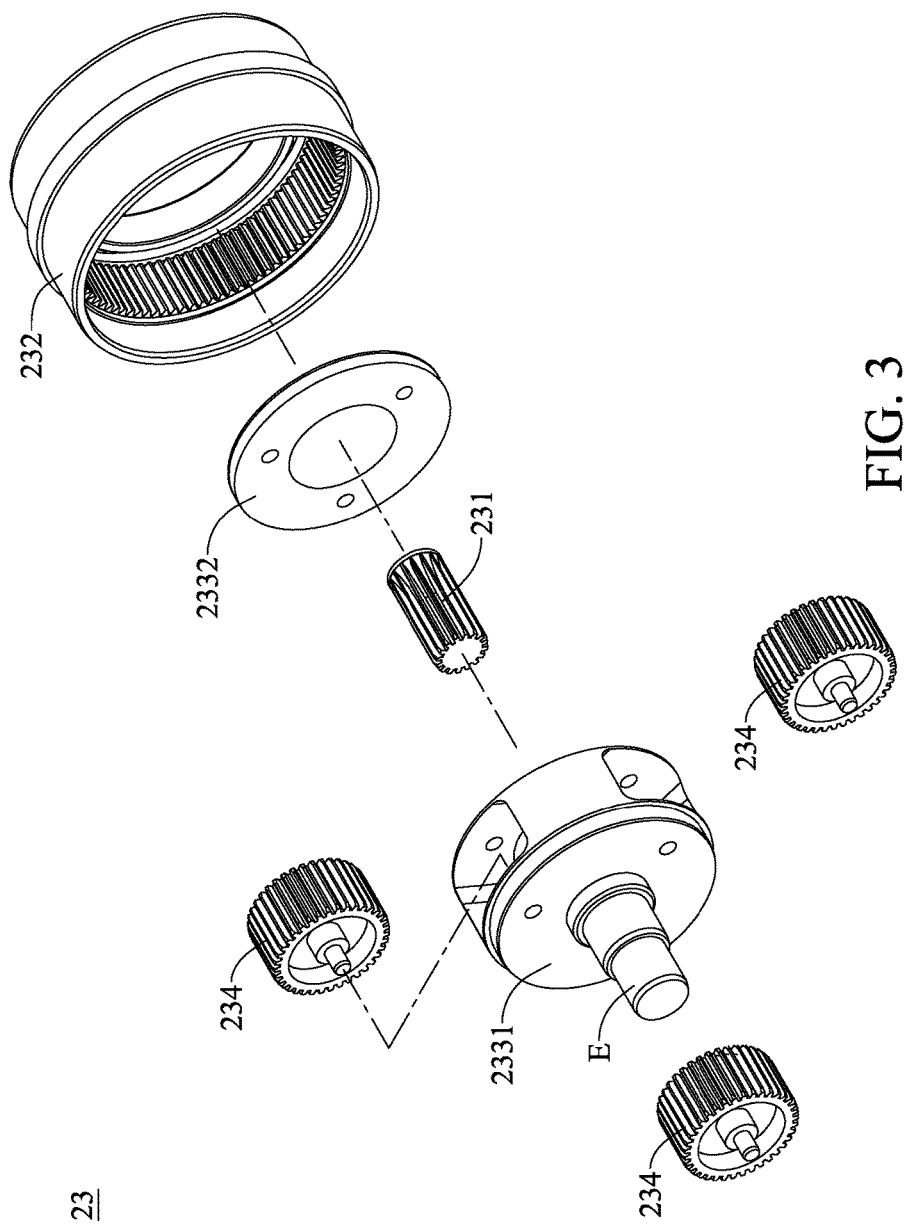
FIG. 3 is a third schematic view of a first embodiment of an electromagnetic spring in accordance with the present disclosure.

Please refer to FIG. 1, FIG. 2 and FIG. 3, which are a first schematic view, a second schematic view and a third schematic view of a first embodiment of an electromagnetic spring in accordance with the present disclosure. FIG. 1 shows the assembly drawing of the electromagnetic spring of the embodiment; FIG. 2 shows the exploded drawing of the electromagnetic spring of the embodiment; and FIG. 3 shows the exploded drawing of the gear set of the embodiment.

As shown in FIG. 1 and FIG. 2, the electromagnetic spring 24 may include a spring main body SB, a gear set 23, a rear cover 243 and a plurality of bearings B; the spring main body SB may include a rotor 241, a gear set 242; the spring main body SB and the gear set 23 may be mounted on the rear cover 243; the gear set 23 may include a first input shaft, a second input shaft and an output shaft.

The stator may be hollow, and may include a stator lamination 2421 and a stator coil 2422.

The rotor may be hollow, and may include a back iron 2411 and a magnet set 2422; the rotor 241 may be disposed in the accommodating space inside the stator 242, and the gear set 23 may be disposed in the accommodating space inside the rotor 241.

The slot number of the stator 242 may be the integral multiple of the pole number of the rotor 241, so the electromagnetic spring 24 may have higher elasticity coefficient; in the embodiment, the slot number of the stator 242 may be 18, and the pole number of the rotor 241 may be also 18.

As shown in FIG. 3, in the embodiment, the gear set 23 may be a planetary gear set, which may include a sun gear 231, a ring gear 232, a planet carrier 233 and a plurality of planet gears 234.

The ring gear 232 may be the first input shaft, and the sun gear 231 may be the second input shaft. The sun gear 231, the ring gear 232, the planet carrier 233 and the planet gears 234 may be coupled with one another.

The planet carrier 233 may include a planet carrier front cover 2311 and a planet carrier rear cover 2332; the planet carrier front cover 2311 may include a cup-shaped planet carrier extension part E, which may serve as the output shaft of the electromagnetic spring 24.

The gear set 23 may be disposed in the accommodating space inside the rotor 241, and the ring gear 232 of the gear set 23 may connect to rotor 241; the power generated by the rotor 241 and the power inputted from the sun gear 231 may be coupled and then outputted from the planet carrier 233.

As described above, the stator 242 and the rotor 241 of the electromagnetic spring 24 may be hollow, so the rotor 241 may be disposed in the accommodating space inside the stator 242, and the gear set 23 may be disposed in the accommodating space of the rotor 241. In the other words, the gear set 23 may be directly integrated with the spring main body SB of the electromagnetic spring 24. The above special structure design can significantly decrease the size of the electromagnetic spring 24. In addition, the elasticity coefficient of the electromagnetic spring 24 can be directly adjusted by controlling the current in order to change its output stiffness; thus, the electromagnetic spring 24 can have high operation response.

Figure 4:
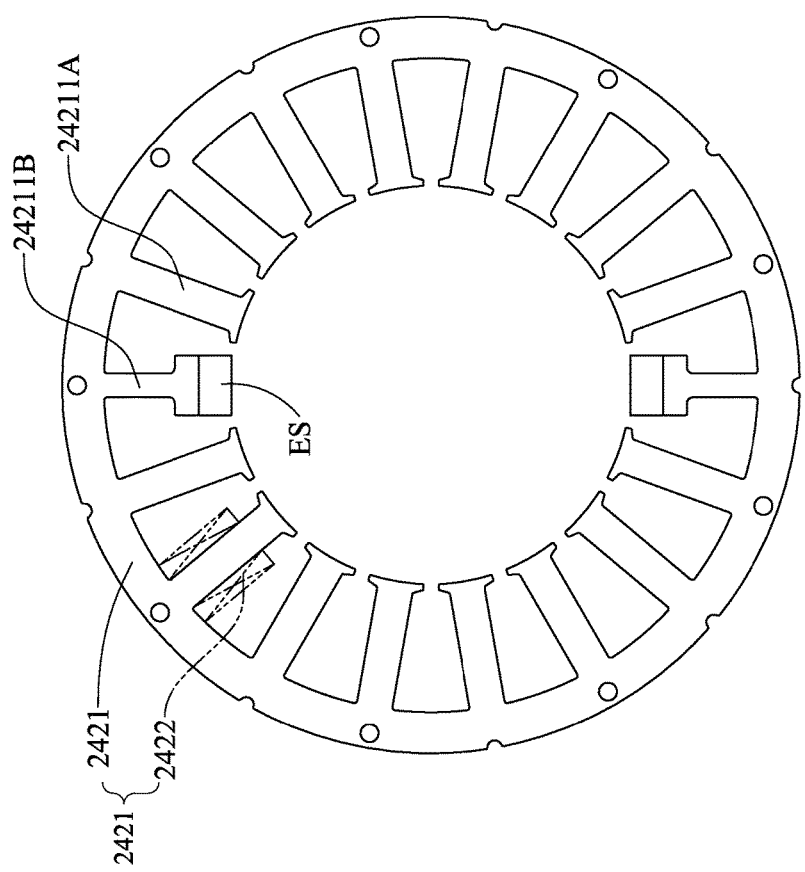
FIG. 4 is a fourth schematic view of a first embodiment of an electromagnetic spring in accordance with the present disclosure.

Please refer to FIG. 4, which is a fourth schematic view of a first embodiment of an electromagnetic spring in accordance with the present disclosure. FIG. 4 illustrates a preferred structure of the stator of the electromagnetic spring of the embodiment.

As shown in FIG. 4, the stator 242 may be hollow, and may include the stator lamination 2421 and the stator coil 2422.

The stator coil 2422 may be the single phase serial winding.

The stator lamination 2421 may include a plurality of first stator teeth 24211A, and the stator coil 2422 may be wound on the first stator teeth 24211A. Besides, in the embodiment, the stator lamination 2421 may further include a pair of second stator teeth 24211B, and the second stator tooth 24211B may be slightly shorter than the first stator tooth 24211A; therefore, a space may be formed between the tooth shoe of each of the second stator teeth 24211B and the rotor 241, and the tooth shoe of each of the second stator teeth 24211B may mount a magnet ES. The special magnet auxiliary structure composed of the second stator teeth 24211B and the magnets ES can effectively increase the electromagnetic field generated by the stator coil 2422, so the electromagnetic spring 24 can still provide the spring effect without power supply. In this way, the electromagnetic spring 24 can have better performance.

Figure 5:
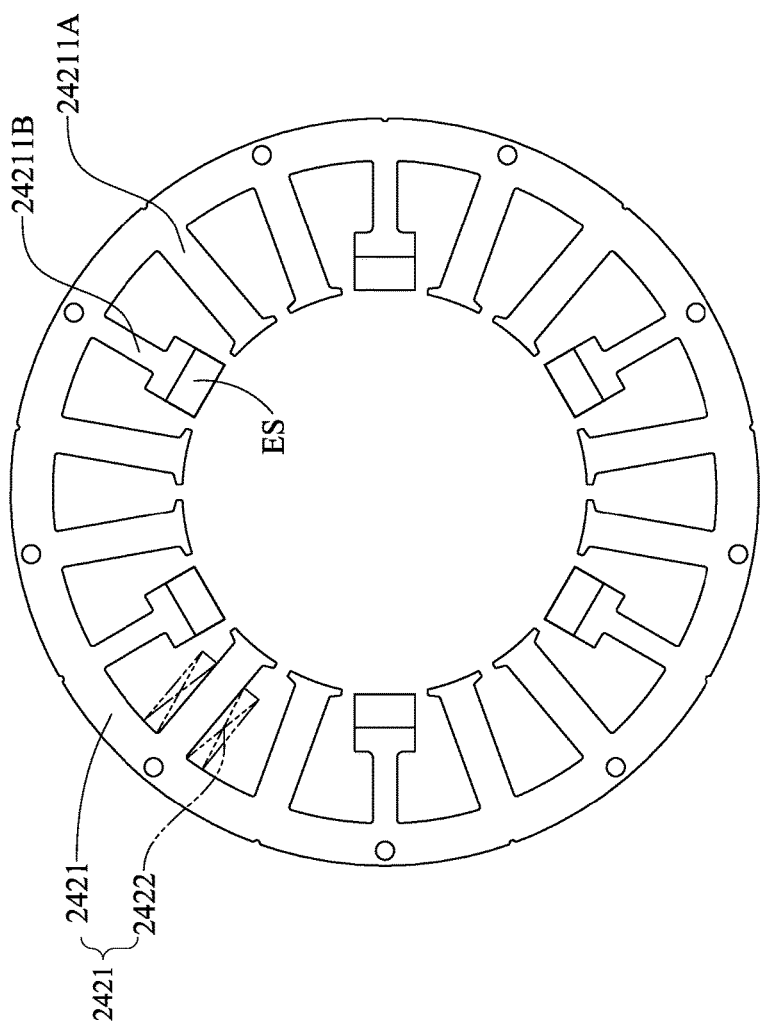
FIG. 5 is a fifth schematic view of a first embodiment of an electromagnetic spring in accordance with the present disclosure.
Figure 6:
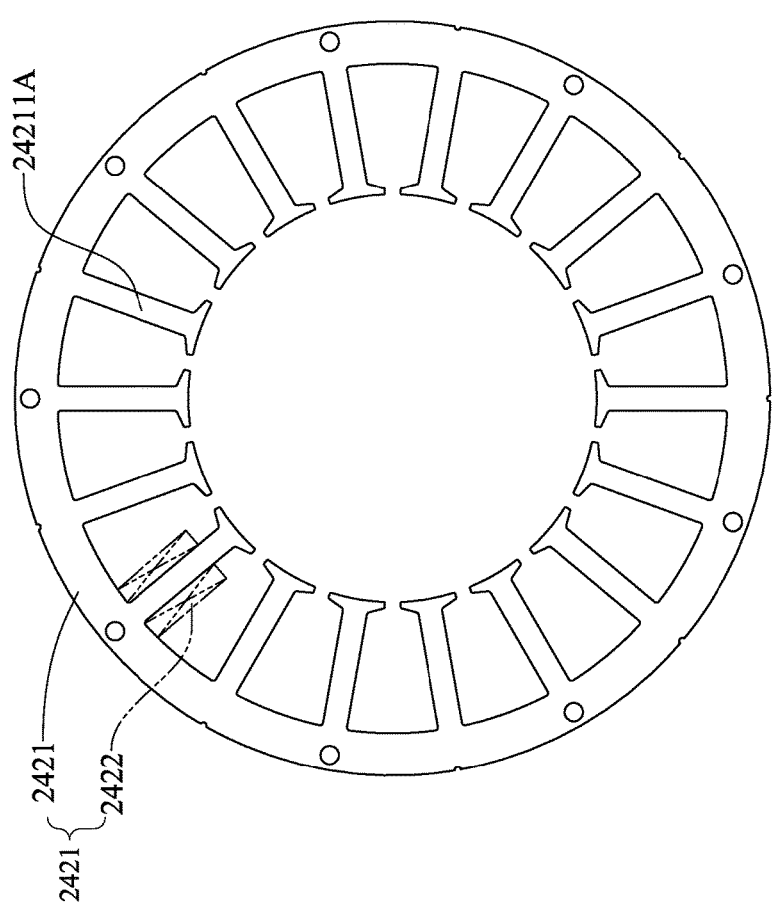
FIG. 6 is a sixth schematic view of a first embodiment of an electromagnetic spring in accordance with the present disclosure.

Please refer to FIG. 5 and FIG. 6, which is a fifth schematic view and a sixth schematic view of a first embodiment of an electromagnetic spring in accordance with the present disclosure. FIG. 5 and FIG. 6 illustrate several preferred structures of the stator of the electromagnetic spring of the embodiment.

The magnet auxiliary structure of the electromagnetic spring 24 of the embodiment may be modified according to the requirements; as shown in FIG. 5, the stator lamination 2421 may include a plurality of first stator teeth 24221A and 3 pairs of the second stator teeth 24211B. The stator coil 2422 may be wound on the first stator teeth 24211A. Similarly, the second stator tooth 24211B may be slightly shorter than the first stator tooth 24211A; therefore, a space may be formed between the tooth shoe of each of the second stator teeth 24211B and the rotor 241, and the tooth shoe of each of the second stator teeth 24211B may mount a magnet ES. The above magnet auxiliary structure can further increase the electromagnetic field generated by the stator coil 2422, so the electromagnetic spring 24 can still provide the spring effect without power supply. In this way, the electromagnetic spring 24 can have better performance.

As shown in FIG. 6, the electromagnetic spring 24 may have no the aforementioned magnet auxiliary structure; in other words, the stator lamination 2421 may only include a plurality of first stator teeth 24211A, but have no the second stator tooth 24211B.

The above structures are just examples, which will not limit the scope of the present disclosure.

Figure 7:
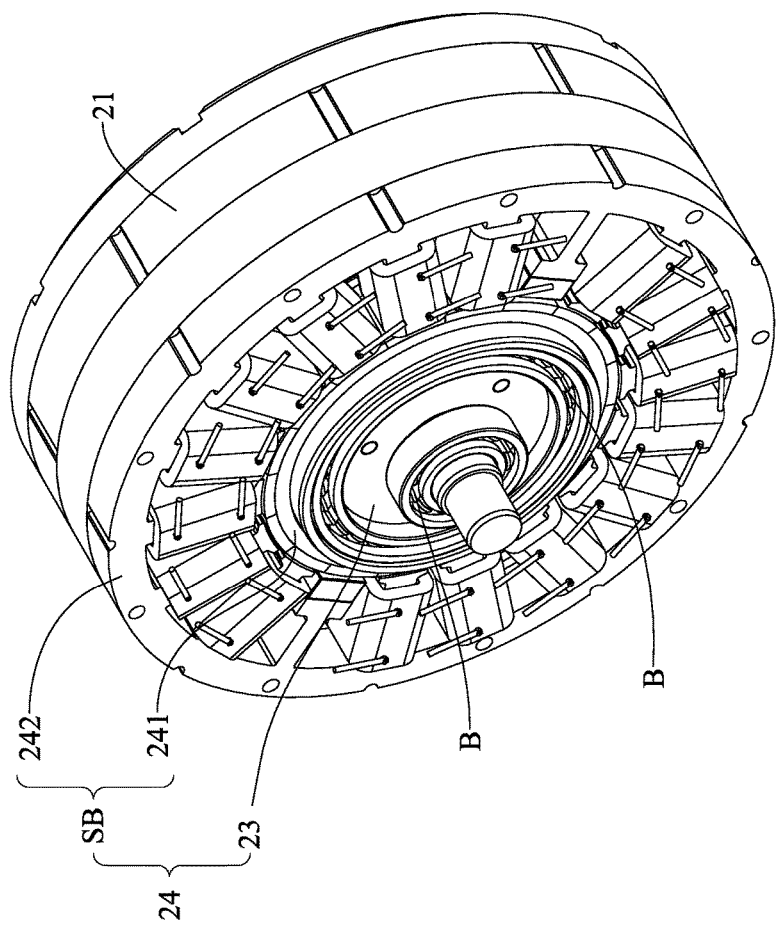
FIG. 7 is a first schematic view of a first embodiment of an elastic actuator in accordance with the present disclosure.
Figure 8:
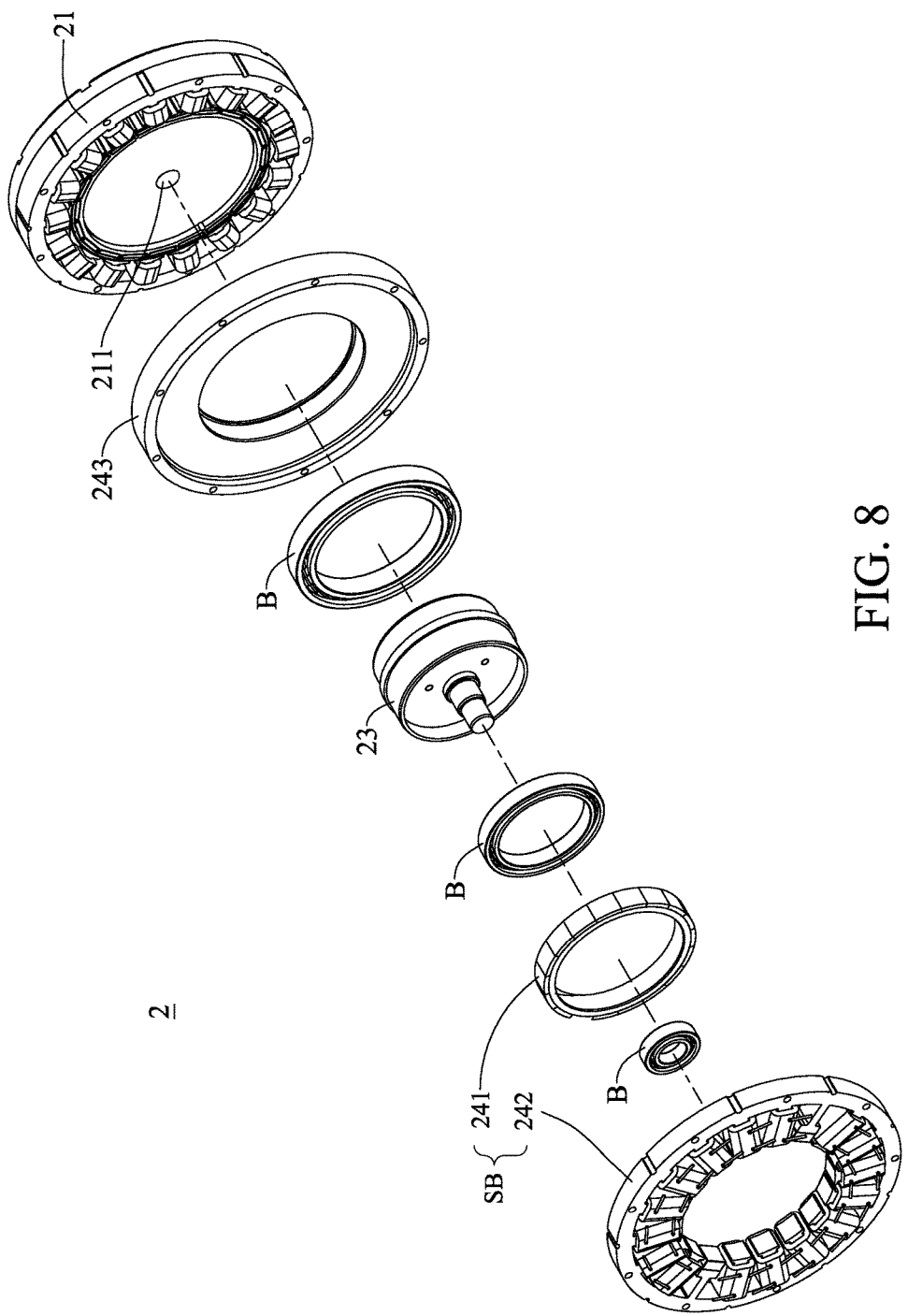
FIG. 8 is a second schematic view of a first embodiment of an elastic actuator in accordance with the present disclosure.
Figure 9:
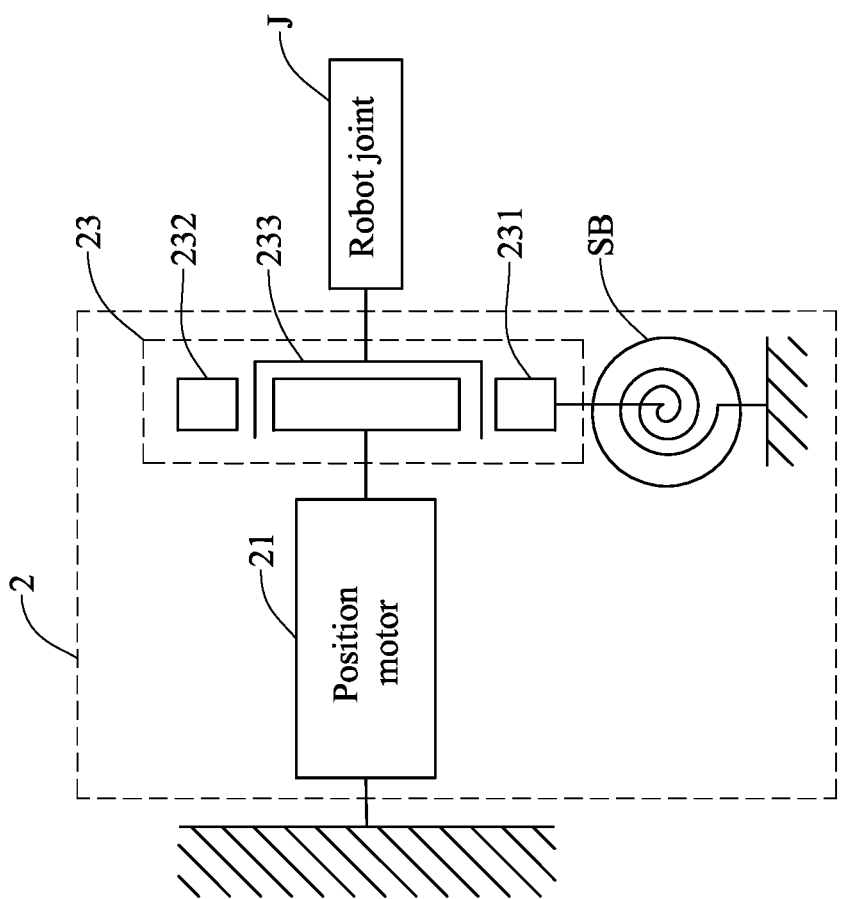
FIG. 9 is a third schematic view of a first embodiment of an elastic actuator in accordance with the present disclosure.

Please refer to FIG. 7, FIG. 8 and FIG. 9, which are a first schematic view, a second schematic view and a third schematic view of a first embodiment of an elastic actuator in accordance with the present disclosure. FIG. 7 shows the assembly drawing of the elastic actuator of the embodiment; FIG. 8 shows the exploded drawing of the elastic actuator of the embodiment; and FIG. 9 shows the assembly drawing of the elastic actuator and a robot joint. The elastic actuator of the embodiment can use the electromagnetic spring to adjust its output stiffness.

As shown in FIG. 7, the elastic actuator 2 may include a positioning motor 21 and an electromagnetic spring 24; the positioning motor 21 may include a motor output shaft 211; in a preferred embodiment, the positioning motor 21 may be a servo motor.

As shown in FIG. 8, the electromagnetic spring may include a spring main body SB, a gear set 23, a rear cover 244 and a plurality of bearings; the spring main body SB may include a rotor 241 and a stator 242; the spring main body SB and the gear set 23 may be mounted on the rear cover 243; the gear set 23 may include a first input shaft, a second input shaft and an output shaft. Similarly, the gear set 23 may be a planetary gear set, which may include a sun gear, a ring gear, a planet carrier and a plurality of planet gears. The ring gear may be the first input shaft, the sun gear 231 may be the second input shaft and the planet carrier may be the second input shaft. The sun gear, the ring gear, the planet carrier and the planet gears may be coupled with one another; the detailed structure of the gear set 23 is the same with previous embodiment, so will not be described therein again.

FIG. 9 illustrates a preferred connection structure of the elastic actuator 2 of the embodiment and a robot joint J, which is a parallel connection structure. As shown in FIG. 9, the spring main body SB may connect to the ring gear 232, the positioning motor 21 may connect to the sun gear 231, and the planet carrier 233 may connect to the robot joint J; therefore, the power generated by the spring main body SB and the power generated by the positioning motor 21 may be coupled and then outputted to the robot joint J via the planet carrier 233.

As described above, the elastic actuator 2 can directly use the electromagnetic spring 24 to adjust its output stiffness, the overall structure of the elastic actuator 2 can be simplified; therefore, the size, weight and cost of the elastic actuator 2 can be significantly reduced.

It is worthy to point out that the elastic actuator, according to one embodiment of the present disclosure, may include an electromagnetic spring, so the output stiffness of the elastic actuator can be freely adjusted according to the requirements, which is more flexible in use.

According to one embodiment of the present disclosure, the elastic actuator may adopt the electromagnetic spring, so the size and the weight of the elastic actuator can be significantly reduced.

According to one embodiment of the present disclosure, the elastic actuator may adopt the electromagnetic spring, so the overall structure of the elastic actuator can be simplified; thus, the cost of the electromagnetic spring can be reduced.

Also, according to one embodiment of the present disclosure, the electromagnetic spring can be controlled by adjusting current, so the operation response of the electromagnetic spring can be very high.

Besides, according to one embodiment of the present disclosure, the slot number of the electromagnetic spring is the integral multiple of its pole number, so the elasticity coefficient of the electromagnetic spring can dramatically increase.

Moreover, according to one embodiment of the present disclosure, the stator coil of the electromagnetic spring may adopt single phase serial winding, which further simplifies the structure of the electromagnetic spring; thus, the cost of the electromagnetic spring can be further reduced.

Furthermore, according to one embodiment of the present disclosure, the stator of the electromagnetic spring may include a magnet auxiliary structure, which may increase the electromagnetic field generated by the stator coil, so the electromagnetic spring can still provide the spring effect without power supply; therefore, the electromagnetic spring can have better performance.

Figure 10:
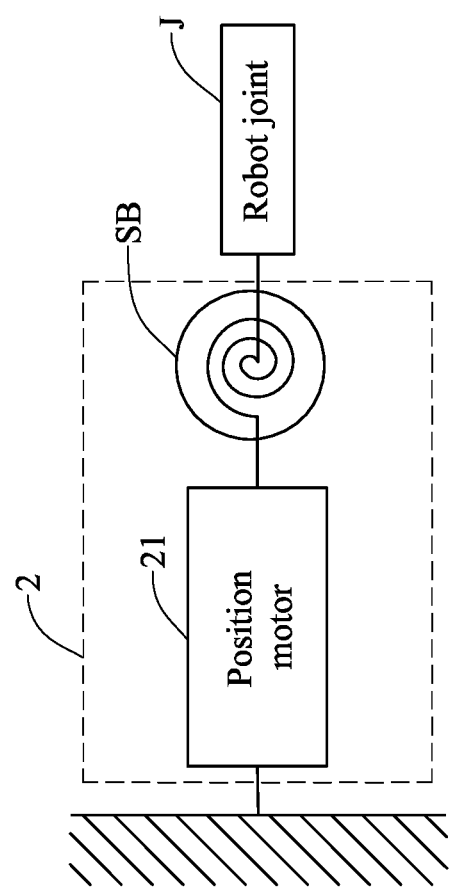
FIG. 10 is a schematic view of a second embodiment of an elastic actuator in accordance with the present disclosure.

Please refer to FIG. 10, which is a schematic view of a second embodiment of an elastic actuator in accordance with the present disclosure; FIG. 10 illustrates another preferred connection structure of the elastic actuator 2 of the embodiment and a robot joint J; the difference between the embodiment and the previous embodiment is that the embodiment adopts serial connection structure.

To sum up, according to one embodiment of the present disclosure, the elastic actuator may include an electromagnetic spring, so the output stiffness of the elastic actuator can be freely adjusted according to the requirements.

According to one embodiment of the present disclosure, the elastic actuator may adopt the electromagnetic spring, so the size and the weight of the elastic actuator can be significantly reduced.

According to one embodiment of the present disclosure, the elastic actuator may adopt the electromagnetic spring, so the overall structure of the elastic actuator can be simplified; thus, the cost of the electromagnetic spring can be reduced.

According to one embodiment of the present disclosure, the electromagnetic spring can be controlled by adjusting current, so the operation response of the electromagnetic spring can be very high.

According to one embodiment of the present disclosure, the slot number of the electromagnetic spring is the integral multiple of its pole number, so the elasticity coefficient of the electromagnetic spring can dramatically increase.

According to one embodiment of the present disclosure, the stator coil of the electromagnetic spring may adopt single phase serial winding, which further simplifies the structure of the electromagnetic spring; thus, the cost of the electromagnetic spring can be further reduced.

According to one embodiment of the present disclosure, the stator of the electromagnetic spring may include a magnet auxiliary structure, which may increase the electromagnetic field generated by the stator coil, so the electromagnetic spring can still provide the spring effect without power supply; therefore, the electromagnetic spring can have better performance.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. An electromagnetic spring, comprising:
   a rotor;
   a stator, operable to drive the rotor to rotate;
   a planetary gear set, comprising a sun gear, a ring gear and a planet carrier, wherein the sun gear connects to a motor output shaft of a position motor, the ring gear connects to the rotor, and a power generated by the rotor and a power generated by the motor output shaft of the position motor and inputted into the sun gear are coupled via the planetary gear set, and then outputted from the planet carrier.

2. The electromagnetic spring of claim 1, wherein the stator is hollow, and the rotor is disposed in an accommodating space inside the stator.

3. The electromagnetic spring of claim 1, wherein a slot number of the electromagnetic spring is an integral multiple of a pole number of the electromagnetic spring.

4. The electromagnetic spring of claim 1, wherein a slot number of the electromagnetic spring is 18 and a pole number of the electromagnetic spring is 18.

5. The electromagnetic spring of claim 1, wherein the stator comprises a stator coil and a stator lamination; the stator lamination comprises a plurality of first stator teeth and the stator coil is wound on the first stator teeth.

6. The electromagnetic spring of claim 2, wherein the rotor is hollow, and the planetary gear set is disposed in an accommodating space inside the rotor.

7. The electromagnetic spring of claim 5, wherein the stator coil is a single phase serial winding.

8. The electromagnetic spring of claim 5, wherein the stator lamination further comprises a plurality of second stator teeth, and a tooth shoe of each of the second teeth mounts a magnet.

9. The electromagnetic spring of claim 6, further comprises a rear cover, wherein the rear cover is hollow, and the rotor, the stator and the planetary gear set are disposed on the rear cover.

10. An elastic actuator, comprising:
    a position motor, comprising a motor output shaft; and
    an electromagnetic spring, comprising:
    a rotor;
    a stator, operable to drive the rotor to rotate;
    a planetary gear set, comprising a sun gear, a ring gear and a planet carrier, wherein the sun gear connects to the motor output shaft of the position motor, and the second input shaft ring gear connects to the rotor; a power generated by the rotor and a power generated by the motor output shaft of the position motor and inputted into the sun gear are coupled via the planetary gear set, and then outputted from the planet carrier.

11. The elastic actuator of claim 10, wherein the stator is hollow, and the rotor is disposed in an accommodating space inside the stator.

12. The elastic actuator of claim 10, wherein a slot number of the electromagnetic spring is an integral multiple of a pole number of the electromagnetic spring.

13. The elastic actuator of claim 10, wherein a slot number of the electromagnetic spring is 18 and a pole number of the electromagnetic spring is 18.

14. The elastic actuator of claim 10, wherein the stator comprises a stator coil and a stator lamination; the stator lamination comprises a plurality of first stator teeth and the stator coil is wound on the first stator teeth.

15. The elastic actuator of claim 10, wherein the position motor is a servo motor.

16. The elastic actuator of claim 11, wherein the rotor is hollow, and the planetary gear set is disposed in an accommodating space inside the rotor.

17. The elastic actuator of claim 14, wherein the stator coil is a single phase serial winding.

18. The elastic actuator of claim 14, wherein the stator lamination further comprises a plurality of second stator teeth, and a tooth shoe of each of the second teeth mounts a magnet.

19. The elastic actuator of claim 16, wherein the electromagnetic spring further comprises a rear cover and the rear cover is hollow; the rotor, the stator and the planetary gear set are disposed on the rear cover.

* * * * *